July 28, 1931.  L. JOHNSON  1,816,187
FLYING SHEARS
Filed April 22, 1926  4 Sheets-Sheet 1

INVENTOR
Lane Johnson
by his attorneys

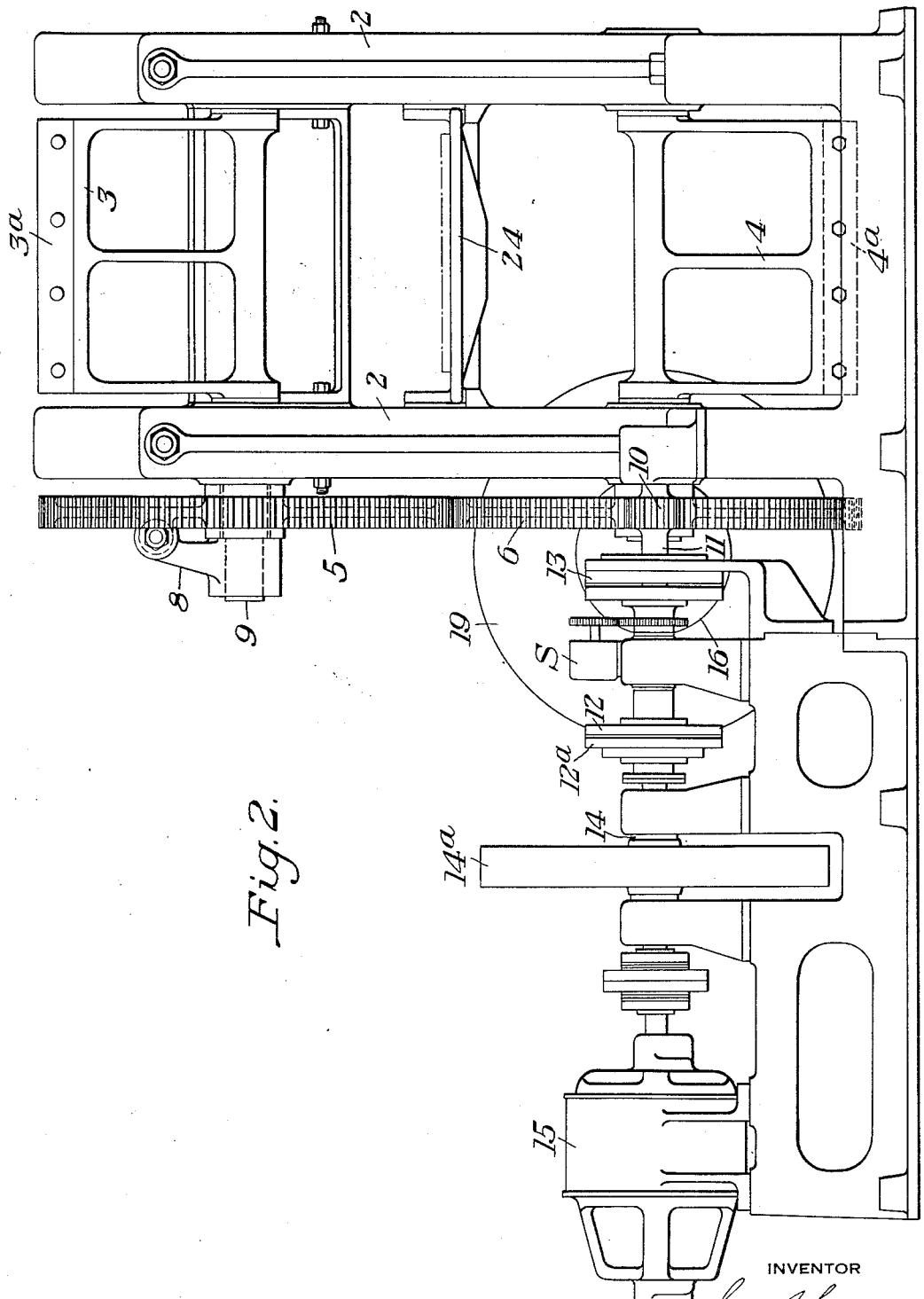

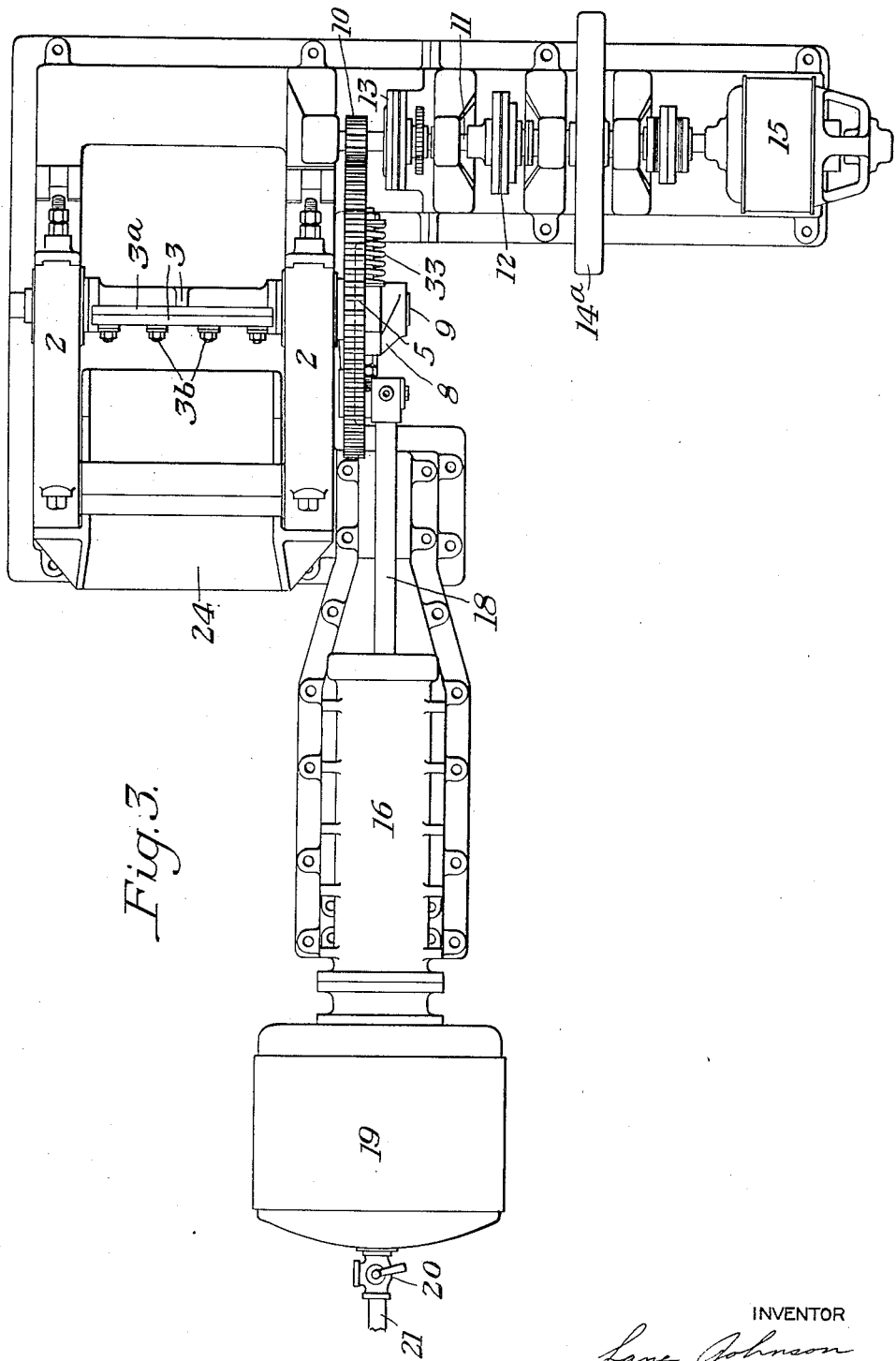

July 28, 1931.  L. JOHNSON  1,816,187
FLYING SHEARS
Filed April 22, 1926  4 Sheets-Sheet 4

INVENTOR
Lane Johnson
by his attorneys
Byrnes, Stebbins & Parmelee

Patented July 28, 1931

1,816,187

UNITED STATES PATENT OFFICE

LANE JOHNSON, OF INGRAM, PENNSYLVANIA, ASSIGNOR TO UNITED ENGINEERING & FOUNDRY COMPANY, OF PITTSBURGH, PENNSYLVANIA, A CORPORATION OF PENNSYLVANIA

FLYING SHEARS

Application filed April 22, 1926. Serial No. 103,788.

This invention relates broadly to the art of metal cutting, and more particularly to flying shears adapted to be intermittently operated under such conditions that pieces of desired length may be cut from rapidly moving lengths of material.

An important object of the present invention is to provide improved means whereby the shear operating mechanism may be quickly accelerated to bring the velocity of the moving shear blades substantially equal to the velocity of the traveling material to be sheared.

A further object is to provide a mechanism whereby intermittently operated flying shears may be operated by a relatively small driving means as compared to driving means heretofore required.

A serious problem in the operation of flying shears has been to quickly accelerate the shear mechanism for a cutting operation without the expenditure of considerable energy on the part of the driving means, thereby necessitating the use of a driving means much more powerful than would be required to move the mechanism at a uniform rate. I provide an improved shear operating mechanism wherein this difficulty is obviated, and the use of a relatively small driving means is made possible. This is accomplished by means whereby a substantial portion of the energy liberated during the periodic deceleration of the shear mechanism may be stored and subsequently utilized to accelerate the mechanism for a shearing operation. I further provide means whereby energy is stored during the part of the operating cycle when the shears are inoperative, the energy thus stored being subsequently available to aid in driving the mechanism during the cutting stroke.

Various other advantages of my improved shear mechanism will be hereafter set forth, for a better understanding of which reference may be had to the accompanying drawings, wherein there are illustrated certain preferred embodiments of my invention.

In the drawings—

Figure 2 is an end elevation to enlarged scale, of the mechanism shown in Figure 1;

Figure 3 is a top plan view of the same mechanism;

Figure 1:
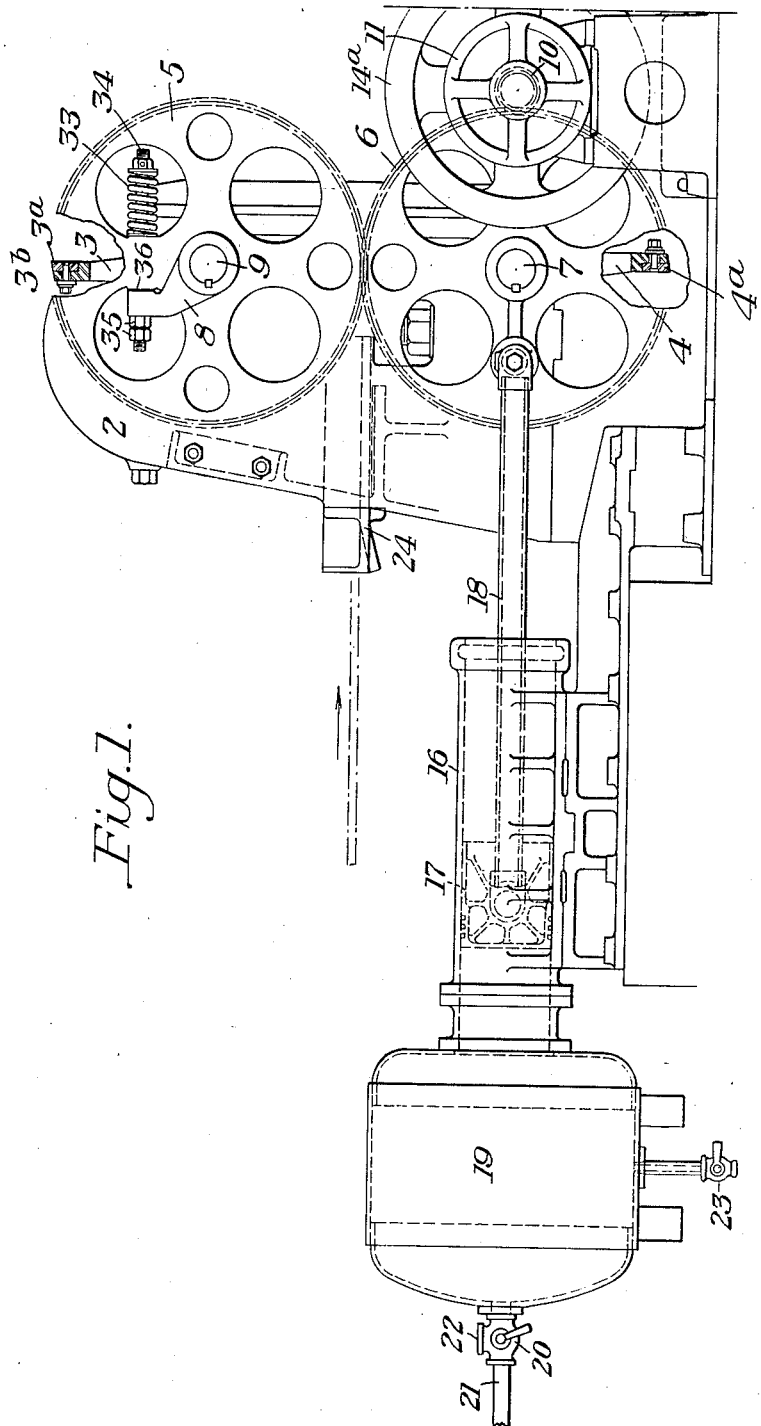
Figure 1 is a side elevation, partly broken away, of a shear embodying my invention.

Referring to the illustrated embodiment, there is shown (Figures 1 and 2) a flying shear having a frame 2, carrying rotary shear blades 3 and 4, driven by intermeshing gears 5 and 6. The gear 6 is keyed to a shaft 7 directly connected to the blade 4, whereby the gear 5 drives the blade 3 through an arm 8 keyed to a shaft 9 carrying the blade 3, as will be more fully hereinafter described.

The gears 5 and 6 are driven by pinion 10 carried on a shaft 11 which is controlled by a magnetic clutch 12 and a magnetic brake 13. The live disc 12a of the clutch 12 is carried by a shaft 14 driven by a motor 15. A fly wheel 14a rotating on the shaft 14 serves to absorb suddenly applied loads, and thus permits the use of a relatively small motor 15, by storing up energy during the portion of the operating cycle when the shear is not operating, for use when load is applied.

Mounted adjacent the shear (Figures 1 and 3) is a cylinder 16 having a piston 17 connected by a rod 18 to the body of the gear 6. Opening directly into the cylinder is a tank 19, suitably connected to the end thereof. The tank 19 is fitted with a three way cock 20, by which air may be admitted under pressure to the tank 19 from a suitable supply line 21, or air may be exhausted from the tank to the atmosphere through an outlet 22. A drain cock 23 is provided to let out any accumulated moisture.

From the drawings it will be apparent that each revolution of the flying shears will result in a complete reciprocation of the piston 17. It will further be observed that the maximum compression in the cylinder and tank occurs when the shear blades 3 and 4 are in wide open position, as illustrated in Figures 1 and 2.

Figure 5:
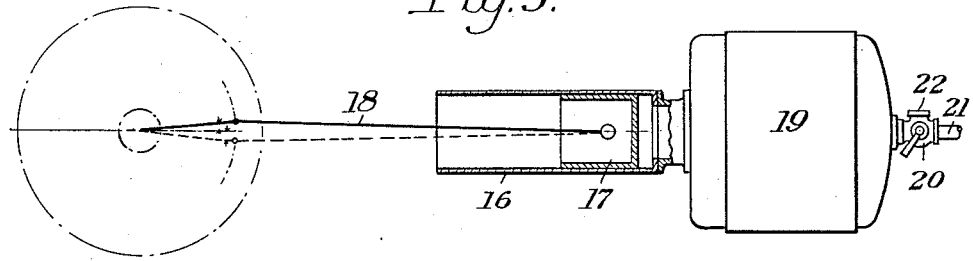
Figure 5 is a diagrammatic view illustrating the operation of the accelerating means.

Preparatory to operating the shears, the blades 3 and 4 are turned to the position shown in Figure 1, thereby putting the connecting rod 18 on dead center, and placing the piston 17 at its point of maximum compression. Compressed air is then admitted to the tank 19 through the three way cock 20, and the cock is then closed. Inasmuch as the connecting rod 18 is on dead center, the piston 17 exerts no torque on the gear 6. As shown in Figure 5, it is not necessary that the connecting rod 18 be exactly on dead center, but a variation of about five degrees is permissible on either side of dead center. In order to prevent any damage which might occur from the connecting rod 18 drifting off dead center and setting the shear in motion, it is preferable that the brake 13 be applied and remain on at all times when the shear is at rest, if there be air under compression in the tank 19.

With the parts disposed as above described, and the motor 15 continuously rotating the fly wheel 14a and clutch disc 12a, the mechanism is in readiness for operation. A piece of material to be sheared moves between the shear blades, as shown in Figures 1 and 2, on a supporting guide 24, until it strikes a controlling flag 25, shown diagrammatically in Figure 6, as will be more fully hereinafter described, the flag 25 cuts off the current which maintains the brake 13 in closed position, and when moved in one direction is effective to energize the clutch 12. As soon as the clutch 12 is made operative, the energy stored in the fly wheel 14a is effective for rotating the pinion 10 and the gears 5 and 6. The gear 6 rotates under the action of the fly wheel 14a and motor 15 until the rod 18 is a slight distance off dead center, whereupon the compressed air in the tank 19 acting upon the piston 17, exerts a powerful torque on the gear wheel 6 and whips the blades 3 and 4 quickly to a high speed. The combined inertia of the swinging blades 3 and 4, the gears 5 and 6, the fly wheel 14a and motor 15, and the moving material being cut, carries the mechanism through the shearing phase, after the shearing mechanism has been brought substantially to the velocity of the moving material by the action of the piston 17.

The mechanism continues to rotate after the cutting is performed, and the inertia of the parts compresses the air in the tank. Thus the machine is brought to rest and a great portion of the energy liberated in stopping it is stored in the compressed air. The fly wheel 14a and motor 15 do not stop, however, as a switch S, geared to the shaft 11, de-energizes the clutch 12 while there is yet sufficient energy in the moving parts to carry the piston 17 to the point of maximum compression, at which time the switch S applies the brake 13.

The switch S has contacts connected in series with the flag switch 25 for controlling the clutch, and contacts connected in parallel with the flag switch for controlling the brake. The switches S and 25 must, therefore, be simultaneously closed to energize the clutch, but either switch individually is capable of closing the brake circuit.

The brake 13 remains in engagement until the flag 25 is again tripped by the moving material being sheared.

Figure 6:
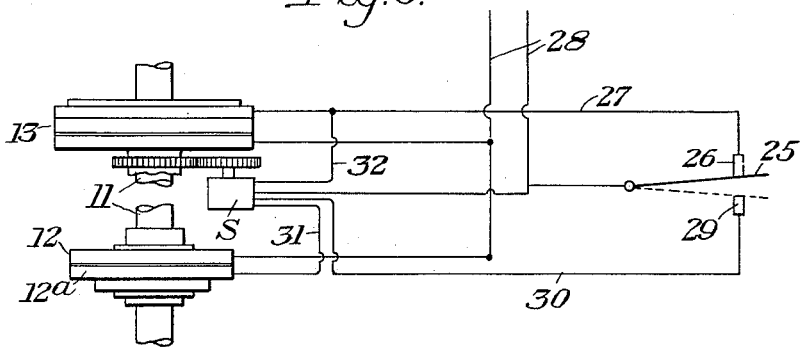
Figure 6 is a circuit diagram of the magnetic clutch and brake mechanism.

In Figure 6, diagrammatically illustrating the electrical control of the clutch 12 and brake 13, there is shown the flag 25 in its normal position in engagement with a contact piece 26 whereby current is supplied directly to the brake 13 through a wire 27. The current supply for operating the brake and clutch is derived from a suitable source through wires 28, one of which leads to the flag 25 and the switch S, while the other leads directly to the clutch 12 and brake 13. When the moving material engages the flag 25, contact is made between the flag 25 and a contact piece 29, from which current is supplied through a wire 30 to the switch S, from which it flows through a wire 31 to the clutch 12. It will be observed that the switch S must be in proper position before the flag 25 is effective for supplying current to the clutch 12. It will further be observed that the brake 13 is released as soon as the flag 25 moves to render the clutch 12 operative.

The switch S, geared to the shaft 11, maintains the clutch 12 energized and operative while the shear blades 3 and 4 are moving through the cutting phase and through sufficient of the remaining part of the cycle that the inertia of the parts is effective to complete the compression of the air in the tank 19. When the parts have slowed down to the condition aforesaid, the switch S breaks the circuit supplying current to the clutch 12, thereby disengaging the clutch and permitting the motor 15 to speed up the fly wheel 14a while the shear mechanism is coming to rest. Depending upon the predetermined amount of compression in the tank 19, the switch S is so adjusted that current is supplied to the magnetic brake 13, through a wire 32, so that the mechanism will be brought to rest with the connecting rod 18 on dead center, but ordinarily the brake 13 will be applied shortly after the clutch 12 has been disengaged. As before stated, it is not necessary that the connecting rod 18 should stop exactly on dead center, but only approximately so, since the brake 13 is sufficiently strong to maintain the parts stationary against the small torque exerted by the connecting rod 18 when it is a slight amount, say five degrees, off dead center.

By means of the three way cock 20, having an exhaust port 22, the air pressure in the tank 19 and cylinder 16, may be adjusted to suit the particular size of shear and speed of cutting. The three way cock 20 may be used also to relieve the pressure in the tank 19 in case the mechanism should be stopped before the connecting rod 18 reaches dead center. If this ever should happen, the air is simply exhausted from the tank 19 and the mechanism rotated to the position shown in Figure 1, after which compressed air is admitted to the tank 19 in an amount sufficient to efficiently operate the particular shears.

As before stated, the blade 3 is driven by a gear 5 (Figure 1) through an arm 8. The arm 8 is keyed to the shaft 9 which is connected with the blade 3. The arm 8 is held in contact with the frame of the gear 5 by a spring 33 surrounding a bolt 34, suitable adjusting nuts 35 being provided to vary the compression of the spring as desired.

It will be observed that the gear 5 positively drives the blade 3 forward in the cutting stroke, but the blade 3, through the spring adjustment on the arm 8, is capable of forward motion relative to the gear 5. Thus, if the material being sheared is moving at a higher velocity than the blade 3 during the cutting operation, the blade 3 is moved forward slightly and the spring 33 absorbs the shock which would otherwise be transmitted directly to the teeth of the gears 5 and 6. It will be understood that the blade 4 is substantially even with the top of the guide 24 during the cutting operation, and therefore no spring shock absorbing mechanism is required on the lower blade 4.

Adjustment between the blades 3 and 4 is provided by shims 36 inserted between the arm 8 and the frame of the gear 5.

The shear blades 3 and 4 (Figure 1) are preferably provided with removable knife edges 3a and 4a, as is usual in the art.

Figure 4:
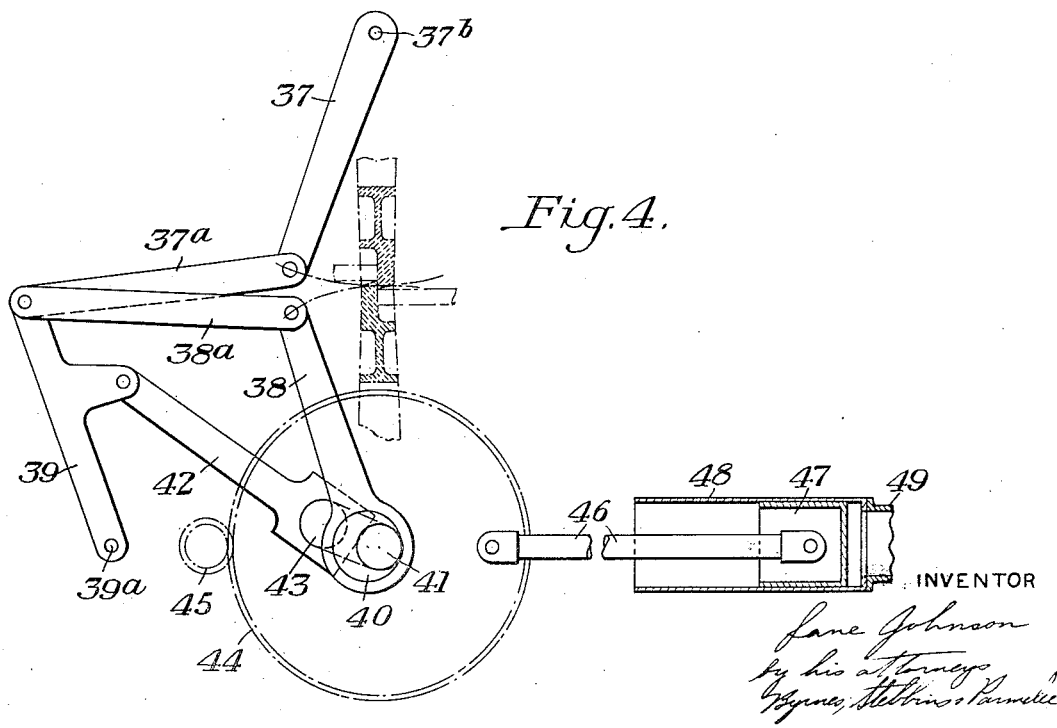
Figure 4 is a diagrammatic view showing my invention applied to a different type of shear from that previously illustrated.

In Figure 4 I have illustrated my improved shear operating mechanism diagrammatically as applied to a different type of shears than that previously shown. In this type of shears the blades are carried by links 37 and 38. Both of the links 37 and 38 are actuated by an oscillating link 39 through suitable connecting links 37a and 38a. The upper link 37 is pivotally mounted at the upper end 37b, and therefore has a simple oscillating motion. The lower link 38, has its lower end guided by an eccentric 40 turning on a drive shaft 41. The link 39 is pivotally mounted at its lower end 39a and is oscillated thereabout by a link 42 moved by a crank 43 carried by the drive shaft 41.

It will thus be seen that as the drive shaft 41 rotates, the links 37 and 38 are given an oscillating movement by the crank 43 through the links 42 and 39, but superimposed on the oscillating motion is an up and down motion imparted to the link 38 by the eccentric 40. Thus the shear blades carried by the links 37 and 38 are moved forward momentarily at substantially the velocity of the material being cut, by the crank 43 through the linkage mentioned, and the blade carried by the link 38 is moved upwardly, to effect shearing of the piece, by means of the eccentric 40. Inasmuch as the shear blades are preferably carried directly in line with the links 37 and 38, they have not been illustrated in the diagrammatic view, but have been shown in chain lines in the position assumed during shearing.

The drive shaft 41 is rotated by a gear wheel 44 driven by a pinion 45. Connected to the gear 44 is a connecting rod 46 actuated by a piston 47 carried in a cylinder 48. The cylinder 48 is provided with a large coupling portion 49 whereby a tank (not shown) similar to the tank 19 in Figure 5, may be attached to the cylinder 48.

In operation, the shear shown in Figure 4 goes through substantially the same cycle as the shear previously illustrated, namely, (a) acceleration of the shear mechanism by the expansion of air previously compressed in the cylinder 48. (b) shearing of the material to be cut by the shear blades in cutting relation, (c) deceleration of the shear mechanism, attended with compression of air in the cylinder 48, and (d) stopping of the mechanism with the connecting rod 46 about on dead center and the air in the cylinder 48 under maximum compression.

The drive means and the control mechanism for the shear in Figure 4 have not been illustrated, as it will be readily apparent to one skilled in the art that the drive means and control mechanism hereinbefore described may be as readily applied to this type of shear as to the shear illustrated in Figure 1.

Thus I provide an improved shear operating mechanism wherein the shear blades are quickly accelerated to the velocity of the moving material to be sheared by the expenditure of energy which is derived from the shear mechanism during the decelerating phase of the shearing cycle, thereby permitting the use of a relatively small driving means.

My shear operating mechanism affords further advantages by the provision of means whereby energy stored during the part of the operating cycle when the shears are inoperative is made subsequently available for use in driving the mechanism during the cutting stroke.

While I have illustrated and described certain preferred embodiments of my invention, it will be apparent that changes may be made in the construction disclosed herein without departing from the spirit of the invention. It will also be apparent to one skilled in the art that any suitable gas may be used in place of air in the cylinder and tank.

It will be understood that the invention is not limited to the details above set forth, or to the type of shears herein described, but that the invention may be otherwise embodied within the scope of the following claims.

I claim:

1. The combination with shearing mechanism having shear blades for cutting moving material, of driving means whereby the blades are moved into cutting relationship, auxiliary means accelerating the blades prior to a cutting operation to substantially the velocity of the moving material and decelerating the blades after the cutting operation, and braking means holding the blades inoperative between cutting operations.

2. The combination with shearing mechanism having shear blades for cutting moving material, of driving means whereby the blades are moved into cutting relationship, auxiliary means accelerating the blades prior to a cutting operation to substantially the velocity of the moving material and decelerating the blades after the cutting operation, braking means holding the blades inoperative between cutting operations, and clutch means whereby the driving means is disengageable from the shear mechanism.

3. The combination with shearing mechanism having shear blades for cutting moving material, of driving means whereby the blades are moved into cutting relationship, means accelerating the blades to substantially the velocity of the moving material prior to a cutting operation and decelerating the blades after the cutting operation, clutch means whereby the driving means is disengageable from the shear mechanism, braking means holding the blades inoperative between cutting operations, and control means for the clutch means, said control means being operable by the moving material.

4. The combination with a shearing mechanism having shear blades for cutting moving material, of driving means whereby the blades are moved into cutting relationship, common means accelerating the blades prior to a cutting operation to substantially the velocity of the moving material and decelerating the blades after the cutting operation, clutch means whereby the driving means is disengageable from the shear mechanism, braking means holding the blades inoperative between cutting operations, and common control means for the braking means and the clutch means, said control means being operable by the moving material.

5. The combination with a shearing mechanism having shear blades for cutting moving material, of means transmitting energy to the shear during substantially half of an operating cycle and absorbing energy from the shear during substantially the remaining half of the cycle, driving means whereby the shear blades are moved into cutting relationship, clutch means whereby the driving means is disengageable from the shear, braking means for holding the shear inoperative between cutting operations, and common control means for the clutch means and the braking means.

6. The combination with a shearing mechanism having shear blades for cutting moving material, of means transmitting energy to the shear during substantially half of an operating cycle and absorbing energy from the shear during substantially the remaining half of the cycle, means for predetermining the energy transmitted to the shear, driving means whereby the shear blades are moved into cutting relationship, clutch means whereby the driving means is disengageable from the shear, braking means for holding the shear inoperative between cutting operations, and common control means for the clutch means and braking means, said control means being operatively engaged by the material being sheared.

7. The combination with a shearing mechanism having shear blades for cutting moving material, of means transmitting energy to the shear during substantially half of an operating cycle and absorbing energy from the shear during substantially the remaining half of the cycle, said means comprising a piston and cylinder cooperating with an elastic fluid, driving means whereby the shear blades are moved into cutting relationship, a clutch whereby the driving means is disengageable from the shear, a brake for holding the shear inoperative between cutting operations, and common control means for the clutch and brake, said control means being operably engaged by the material being sheared.

8. The combination with a shearing mechanism having shear blades for cutting moving material, of means transmitting energy to the shear during substantially half of an operating cycle and absorbing energy from the shear during substantially the remaining half of the cycle, said means comprising a piston and cylinder cooperating with an elastic fluid, means for initially predetermining the maximum pressure of the elastic fluid, driving means whereby the shear blades are moved into cutting relationship, a clutch for disengaging the driving means from the shear, a brake for holding the shear in inoperative position between cutting operations, and common control means for the clutch and brake, said control means being operably engaged by the material being sheared.

9. The combination with a shearing mechanism having blades, of means transmitting energy to the shear during substantially half of an operating cycle and absorbing energy from the shear during substantially the remaining half of the cycle, said means comprising a piston and cylinder cooperating with an elastic fluid, means for initially predetermining the maximum pressure of the elastic fluid, driving means whereby the shear blades are moved into cutting relationship, a magnetic clutch whereby the driving means is engageable with the shear, a magnetic brake for holding the shear inoperative between cutting operations, and common control means for the brake and clutch, said control means being operably engaged by the material being sheared.

10. In a flying shear having shear blades for cutting moving material, a plurality of gears connected to the shear blades, yielding means connecting one of the blades to a gear, whereby the blade may be moved forwardly relative to the gear, driving means engageable with the gears whereby the blades are moved into cutting relationship, common accelerating and decelerating means connected to at least one of the gears, whereby the blades are accelerated prior to shearing to substantially the velocity of the moving material, and decelerated substantially to rest after shearing, said accelerating and decelerating means comprising a piston and cylinder cooperating with compressed air, a brake effective for holding the blades at rest between shearing operations, and control means for the brake.

11. The combination with shearing mechanism having rotating shear blades for cutting moving material, of driving means for advancing said blades in the direction of movement of said material, for moving them into cutting relationship, and additional means accelerating movement of the blades to substantially the velocity of the moving material prior to a cutting operation, and means for stopping the blades at a position where said accelerating means is ineffective.

12. The combination with shearing mechanism having shear blades for cutting moving material, of driving means for advancing said blades in the direction of movement of said material, for moving them into cutting relationship, and additional means accelerating movement of the blades to substantially the velocity of the moving material prior to a cutting operation, said last mentioned means being effective for decelerating the speed of the blades after the cutting operation.

13. The combination with shearing mechanism having shear blades for cutting moving material, of driving means whereby the blades are moved along one component into cutting relationship, and fluid pressure means cooperating with said driving means for effecting movement of the blades along the same component into cutting relationship.

14. The combination with shearing mechanism having shear blades for cutting moving material, of driving means whereby the blades are moved along one component into cutting relationship, and fluid pressure means cooperating with said driving means for effecting movement of the blades along the same component into cutting relationship, said fluid pressure means being effective for decelerating the speed of travel of the blades after a cutting operation.

15. The combination with a shearing mechanism having rotating shear blades for cutting moving material, and means for driving said blades at constant speed, of means transmitting energy to the shear to accelerate the blades during substantially half of an operating cycle and absorbing energy from the shear to decelerate the blades during substantially the remaining half of the cycle, means for disconnecting the blades from the driving means so that they are finally stopped in such position as to render said transmitting and absorbing means ineffective.

16. The combination with a shearing mechanism having shear blades for cutting moving material, of means transmitting energy to the shear during substantially half of an operating cycle and absorbing energy from the shear during substantially the remaining half of the cycle, driving means whereby the shear blades are moved into cutting relationship, clutch means whereby the driving means is disengageable from the shear, braking means for holding the shear inoperative between cutting operations, and control means for the clutch means.

17. A flying shear for cutting moving material comprising rotatable shear blades, a motor for driving said blades, a clutch for connecting the motor to the blades and a brake for preventing movement of the blades, a fluid-pressure cylinder containing a piston having operative relation to said blades for accelerating and decelerating them, and means actuated by said moving material to control said brake and clutch.

18. A flying shear for cutting movable material comprising shear blades, disengageable means for driving said blades and locking means for the blades, energy-storing means operatively related to said blades for successively accelerating and decelerating them, and means actuated by said moving material for controlling said disengageable means and said locking means.

19. In a flying shear having rotary shear blades geared together for cutting moving material, driving means engageable with the gears whereby each blade is moved toward the other, means whereby the blades are accelerated prior to shearing to substantially the velocity of the moving material, and decelerated substantially to rest after shearing, said accelerating and decelerating means having a crank connection to one of said rotary shear blades.

In testimony whereof I have hereunto set my hand.

LANE JOHNSON.